US006675651B2

(12) United States Patent
Yanagisawa et al.

(10) Patent No.: US 6,675,651 B2
(45) Date of Patent: Jan. 13, 2004

(54) VIBRATION GYRO

(75) Inventors: Tohru Yanagisawa, Kodaira (JP); Izumi Yamamoto, Sayama (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 10/235,958

(22) Filed: Sep. 6, 2002

(65) Prior Publication Data

US 2003/0056590 A1 Mar. 27, 2003

(30) Foreign Application Priority Data

Sep. 7, 2001 (JP) .......................... 2001-271132
Mar. 19, 2002 (JP) .......................... 2002-075634

(51) Int. Cl.$^7$ .............................................. G01C 19/00
(52) U.S. Cl. ..................................................... 73/504.14
(58) Field of Search ........................ 73/504.12, 504.15, 73/504.16, 504.14; 310/370

(56) References Cited

U.S. PATENT DOCUMENTS 5,451,828 A * 9/1995 Tomikawa et al. .......... 310/370
5,533,397 A * 7/1996 Sugitani et al. ........... 73/504.16
5,691,595 A * 11/1997 Tomikawa et al. .......... 310/370
6,257,058 B1 * 7/2001 Murata ................... 73/504.16

OTHER PUBLICATIONS

U.S. patent application Publication No. US 2001/0010173 A1.*
U.S. patent application Publication No. US 2002/0148290 A1.*
U.S. patent application Publication No.US 2001/0020388 A1.*
Patent Abstracts of Japan—Publication No. 07–083671, dated Mar. 28, 1995.
Patent Abstracts of Japan—Publication No. 08–094362, dated Apr. 12, 1996.

* cited by examiner

*Primary Examiner*—Richard A. Moller
(74) *Attorney, Agent, or Firm*—Smith, Gambrell & Russell, LLP

(57) ABSTRACT

A vibration gyro has a vibrator composed of three tines (first, second, and third tines) which are aligned in a single line at prescribed intervals in one direction on a base and extend in a direction perpendicular to an aligning direction. A central second tine and an adjacent first tine on a left are driven by oscillator. Further, Coriolis force generated on the second tine and the third tine on a right is detected by a detector. In this vibration gyro, the dimensions of the parts are determined so as to cause the third tine to substantially stand still when the first and second tines are driven by the oscillator.

9 Claims, 12 Drawing Sheets

VIBRATION GYRO

BACKGROUND OF THE INVENTION

1. Field of the Invention

The present invention relates to a vibration gyro for detecting an angular velocity.

2. Description of the Prior Art

Conventionally, mechanical rotary gyroscopes have been used as inertial navigation systems of airplanes and ships. The systems have been large in size and expensive. Thus, it has been difficult to build the gyroscopes into small electronic equipment and small conveying machines.

However, in recent years, miniaturization of gyroscopes has been studied to put a vibration gyro into practical use. In the vibration gyro, a vibrator is excited by a piezoelectric element, and voltage generated by vibration resulting from Coriolis force applied to the vibrator when it rotates is detected by another piezoelectric element provided on the vibrator. Such gyroscopes have been used for navigation systems of vehicles, shake detectors of video cameras, and so on.

Particularly, a vibration gyro using a piezoelectric single crystal is promising because the single crystal has a simple configuration, is adjusted with ease, and is excellent in temperature characteristics. As an example using the piezoelectric single crystal, the following will discuss the configuration and function of a tuning-fork vibration gyro using quartz in accordance with FIGS. 5 and 6.

The tuning-fork vibration gyro is formed by evaporating driving detecting electrodes onto a vibrator J10, on which quartz is integrally worked. The vibrator J10 is configured such that two tines J11 and J12 disposed laterally in parallel are connected to a base J15. Driving electrodes J1 to J4 are deposited onto the four sides of the left tine J11. Detecting electrodes J5 to J8 are deposited onto the four sides of the right tine J12. The bottom of the base J15 is used to support the vibration gyro.

Here, the extending direction of the tines J11 and J12 is referred to as a Y'-axis direction, the aligning direction of the tines J11 and J12 is referred to as an X-axis direction, and a direction orthogonal to X-axis and Y'-axis directions is referred to as Z'-axis direction. As shown in FIG. 5, a rectangular Cartesian coordinate of X-Y'-Z' is formed by rotating the rectangular Cartesian coordinate of X-Y-Z, on which the X-axis and Z-axis conform to crystal axes, by θ around the X-axis.

First, when the first tine J11 is bent to the second tine J12 in the X-axis direction, a part around an electrode J2 expands in the Y'-axis direction, and a part around an electrode J4 shrinks in the Y'-axis direction. At this moment, in the quartz, an electric field appears on the part around the electrode J2 in the X-axis direction and an electric field appears on the part around the electrode J4 in the −X-axis direction due to the piezoelectric effect.

At this moment, in view of the direction of the electric field, the electrodes J2 and J4 are equal in potential and are higher in potential than the center of the tines. In the X-axis direction, the electrodes J1 and J3 positioned near the center of the tines are relatively lower in potential than the electrodes J2 and J4. Thus, a potential difference appears between the electrodes J2 and J4 and the electrodes J1 and J3.

As the piezoelectric effect is reversible, when a potential difference is provided between the electrodes J2 and J4 and the electrodes J1 and J3, an electric field appears accordingly in the quartz, and the left tine J11 is bent in the X-axis direction.

Thus, the potentials of the electrodes J1 and J3 are amplified by an amplifier JG according to an amplification factor exceeding the oscillating condition, the phase is regulated by a phase-shift circuit JP so as to satisfy an oscillating condition, and the potentials are returned to the electrodes J2 and J4. Hence, energy is converted between mechanical return force, which is generated by the bending of the left tine J11, and electrical force, and the left tine J11 can be subjected to self-excited oscillation in the X-axis direction.

Entirely on the tuning-fork vibrator J10, in order to balance momentum between the left tine J11 and the right tine J12, when the left tine J11 is moved in the X-axis direction, the right tine J12 moves in the −X-axis direction, and when the left tine J11 moves in the −X-axis direction, the right tine J12 moves in the X-axis direction. The movements of the left and right tines J11 and J12 are called in-plane bending vibration, considering the fact that vibration in a single plane is generally regarded ideal for an ordinary tuning-fork. The vibrations of the first tine J11 caused by the amplifier JG and the phase-shift circuit JP are the same as the in-plane bending vibration. The frequency is substantially equal to a resonance frequency of the in-plane bending vibration of the vibrator J10.

In this state, when the vibrator J10 is entirely rotated around the Y'-axis with an angular velocity ω, Coriolis force Fc is applied to the left and right tines J11 and J12 of the vibrator J10 in the Z'-axis direction, which intersects in-plane bending vibration. The Coriolis force Fc can be expressed by the equation below.

$$Fc = 2 \cdot M \cdot \omega \cdot V$$

In this equation, M represents a mass of the left tine J11 or the right tine J12, and V represents a speed of the left tine J11 or the right tine J12.

The Coriolis force Fc excites bending vibration on the left tine J11 and the right tine J12. The bending vibration is displaced in the Z'-axis direction (orthogonal to the X-axis direction which is the operating direction of the in-plane bending vibration). Hereinafter, the bending vibration will be referred to as out-of-plane bending vibration. Further, Coriolis force does not increase in proportion to the displacement but to the speed. Thus, out-of-plane bending vibration generated by Coriolis force occurs with a phase delayed by 90° from the in-plane bending vibration.

Due to the out-of-plane bending vibration, a part around electrodes J5 and J8 of the right tine J12 expands and shrinks in the Y'-axis direction, and a part around electrodes J6 and J7 expands and shrinks in opposite phase from the part around the electrodes J5 and J8.

For example, when the part around the electrodes J5 and J8 extends in the Y'-axis direction, an electric field appears in the X-axis direction on the part around the electrodes J5 and J8 in the right tine J12. At this moment, as the part around the electrodes J6 and J7 shrinks in the Y'-axis direction, an electric field appears in the −X-axis direction on the part around the inner electrodes J6 and J7 in the right tine 12. Namely, when the electrode J5 is higher in potential than the electrode J8, the electrode J7 is higher in potential than the electrode J6.

Moreover, when the part around the electrodes J5 and J8 shrinks in the Y'-axis direction, an electric field appears in the −X-axis direction on the part around the inner electrodes J5 and J8 in the right tine J12. At this moment, as the part around the electrodes J6 and J7 expands in the Y'-axis direction, an electric field appears in the X-axis direction on the part around the inner electrodes J6 and J7 in the right tine 12. Namely, when the electrode J5 is lower in potential than the electrode J8, the electrode J7 is lower in potential than the electrode J6.

A potential difference between the electrodes J5 and J8 and the electrodes J6 and J7 is changed according to the direction of the second tine J12 which vibrates in the Z'-axis direction. From a different point of view, when the electrode J5 has a high potential, the electrode J7 also has a high potential. At this moment, the electrodes J6 and J8 have low potentials. Meanwhile, when the electrode J5 has a low potential, the electrode J7 also has a low potential. At this moment, the electrodes J6 and J8 have high potentials. Coriolis force occurs as a potential difference between the electrode J5 or J7 and the electrode J6 or J8.

A detection signal of the Coriolis force is fed to one of the input terminals of a multiplying circuit JM via a differential buffer JD, which has the electrodes J5 and J7 as one input signal and the electrodes J6 and J8 as the other input signal. Further, the output of an oscillation system of in-plane bending vibration is fed to the other input terminal of the multiplying circuit JM via the amplifier JG, a phase-shift circuit JP2, and a comparator JC. The phase-shift circuit JP2 shifts the phase of the output of the amplifier JG by 90° in order to correct Coriolis force which occurs with a delay of 90 degrees from the output of the oscillation system of in-plane bending vibration. The comparator JC binarizes the output of the phase-shift circuit JP2 to produce a reference signal.

The result of the multiplication and detection in the multiplying circuit JM is further smoothed by an integrating circuit JS and is detected as direct current output. The direct current output is in proportion to the Coriolis force Fc. Incidentally, as described above, as the Coriolis force Fc increases in proportion to the angular velocity ω, the angular velocity ω can be found based on the direct current output.

However, the tuning-fork vibration gyro using a conventional piezoelectric single crystal has the following problems:

In general, when supporting a vibrator, in order to minimize the influence of the supporting effect on the vibrator, it is ideal to support the vibrator at a position where it hardly moves during vibration, that is, only at a node of vibration. The tuning-fork vibration gyro handles two-way bending vibration orthogonal to the extending direction of tines. In the two-way bending vibration, regarding in-plane bending vibration used for driving, an ideal support can be substantially realized by supporting the bottom of a base. In this supporting method, the tuning-fork vibrator only slightly vibrates in the extending direction of the tines, and the frequency is changed by several PPM in accordance with a change on a supporting part.

Meanwhile, for a tuning-fork vibrator, out-of-plane bending vibration excited by Corirolis force, which occurs on the tines due to in-plane bending vibration and the rotation of the vibrator, turns into a torsional vibration around a center symmetry axis of the tuning fork. Thus, it is difficult to support the vibrator without transmitting vibrations to the outside.

When supporting a vibrator in such a conventional manner as exerts a disadvantageous effect on the vibrator, such as supporting it at the bottom of the base, out-of-plane bending vibration, which is detecting vibration generated by Coriolis force, and leakage vibration of in-plane bending vibration which is driving vibration described later to detecting vibration, are conveyed to the outside of the vibrator via the supporting part, resulting in a reduced S/N ratio and the occurrence of drift.

Further, in a tuning-fork vibration gyro with two tines, a stick-shaped vibrator performs both driving and detection and the detecting part vibrates. Theoretically, as the driving direction and the detecting direction intersect orthogonally each other, the driving vibration does not affect the detecting vibration. However, in the case of an actual working accuracy, the orthogonality is not enough so that vibration slightly occurs as leakage in the direction of the out-of-plane bending vibration. Hence, a detecting electrode detects the leakage vibration caused by the driving vibration.

If the resonance frequency of driving vibration is separated from the resonance frequency of detecting vibration, a slight excitation of detecting vibration by driving vibration can be reduced. However, in the vibration gyro, as the resonance frequencies of the driving vibration and the detecting vibration are close to each other to allow transmission of Coriolis force, it is not possible to prevent driving vibration from leaking to detecting vibration.

Further, due to electrostatic capacity coupling between a driving electrode and a detecting electrode, the detecting electrode detects driving vibration. This indicates that detecting output is produced despite the absence of Coriolis force. As the driving vibration has large amplitude, the detecting vibration of small amplitude is considerably affected by a change in environment of a supporting part and a slight change of the driving vibration that is caused by a change in temperature of the vibrator, resulting in a reduced S/N ratio and the occurrence of drift.

SUMMARY OF THE INVENTION

The vibration gyro of the present invention has a vibrator composed of a base and three tines which are aligned in a single line at prescribed intervals in one direction on the base and extending in a direction perpendicular to the aligning direction. Of the three tines, a central second tine and an adjacent first tine on the right or left are driven by oscillator. Further, Coriolis force generated on the other third tine is detected by detector.

The following aspects are applicable in the present invention.

In the vibration gyro, when the first and second tines are driven by the oscillator, the dimensions of the individual parts are determined so as to cause the third tine to substantially stand still.

In order to cause the third tine to substantially stand still when the first and second tines of the vibrator are driven by the oscillator, the following aspects (1) and (2) are applicable.

(1) A width W3 of the third tine is smaller than a width W1 of the first tine and a width W2 of the second tine ((WI, W2)>W3).

Moreover, in this case, the width of the first tine is equal to the width W2 of the second tine (W1=W2), and the width W3 of the third tine is reduced by 10 to 20% from the width W1 of the first tine and the width W2 of the second tine (W3=0.8 to 0.9×(W1, W2)).

(2) A step (shoulder) is formed between the side of the first tine that is opposite from the second tine and the side of the base at the side of the first tine.

Moreover, in this case, the width W1 of the first tine and the width W2 of the second tine are equal to each other, and the width W3 of the third tine is 3/5±10% of the width W1 of the first tine (W1=W2; W3=0.54 to 0.66×(W1, W2)).

Besides, in the vibrating gyro of the present invention, the first tine and the second tine are caused to make first bending vibration within a plane perpendicular to the thickness direction of the vibrator by using the oscillator. And then, second bending vibration perpendicular to the plane, which is caused on the vibrator by the first bending vibration due to Coriolis force resulting from the rotation of the vibrator, is detected by the detector using the third tine.

BRIEF DESCRIPTION OF THE DRAWINGS

Other objects and characteristics of the above-described present invention will be explained in the following description of embodiments with reference to the accompanied drawings wherein.

DETAILED DESCRIPTION OF THE PREFERRED EMBODIMENTS

First, the following will discuss a basic structure of a vibration gyro according to the present invention.

The vibration gyro of the present invention is a tuning-fork type with three tines and is formed particularly by using quartz having an excellent temperature characteristic among piezoelectric single crystals. The quartz is a single crystal of $SiO_2$ and belongs to a trigonal system having four crystal axes at room temperature. One of the crystal axes is called c-axis which passes through the vertex of the crystal, and the other three axes are called a-axes which form an angle of 120° within a plane perpendicular to the c-axis. In this case, one of the three a-axes serves as X-axis, the c-axis serves as Z-axis, and Y-axis is provided in a direction perpendicular to the X-axis and Z-axis.

Figure 1:
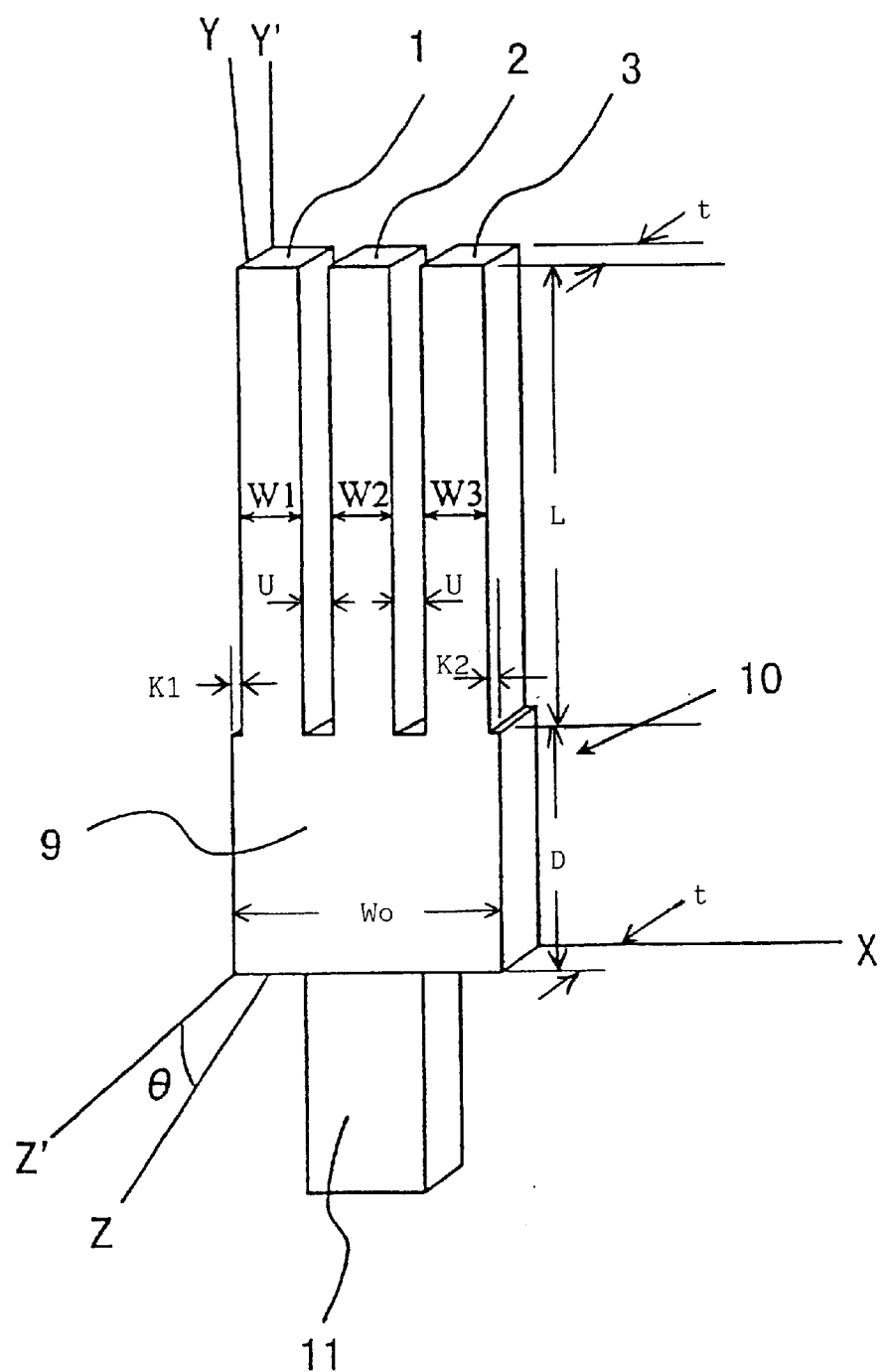
FIG. 1 is a perspective view showing a vibrator constituting a vibration gyro with a three-tine tuning fork according to one aspect of the present invention.

As shown in FIG. 1, in the present invention, a Cartesian coordinate system formed by coordinate axes Y'- and Z'-, and X-axis is used. The coordinate axes Y'- and Z'-are rotated in a direction from the Z-axis to the Y-axis around the X-axis by θ from the Y- and Z-axes. As the resonance frequency of driving/detecting vibration is changed in temperature characteristic dependent on the rotation angle θ, the rotation angle θ is selected from 0 to 10 degrees in view of temperature conditions for using the vibration gyro.

The three-tine tuning fork constituting a vibration gyro 10 is a structure with a uniform thickness. When the three-tine tuning fork is cut out from quartz, the Z'-axis direction is used as a thickness direction of the three-tine tuning fork. The three-tine tuning fork cut out thus has a two-dimensional shape within an X-Y' plane.

As shown in FIG. 1, the three-tine tuning fork is constituted of a base 9, three tines (left tine 1, central tine 2 and right tine 3) extending in parallel from the base 9 in the Y'-axis direction, and a supporting part 11 formed on the bottom of the base 9. Namely, the base 9, the tines 1 to 3, and the supporting part 11 form an integral structure with a uniform thickness t.

The tines 1, 2, and 3 are formed as rectangular solids having a length L (dimension in the Y'-axis direction), a thickness t (dimension in the Z'-axis direction), and widths W1, W2, and W3 (dimension in the X-axis direction). A gap between the tine 1 and the tine 2 and a gap between the tine 2 and tine 3 are both expressed as U. Electrodes formed by metallized films (not shown in FIG. 1) are provided on the sides of the tines 1 to 3.

The base 9 is formed into a square pole having a height D (dimension in the Y'-axis direction), a width W0 (dimension in the X-axis direction), and a thickness t (dimension in the Z'-axis direction). Between the left side of the base 9 and the left side of the left tine 1, a step (shoulder) K1 is formed in the X-axis direction. Further, between the right side of the base 9 and the right side of the right tine 3, a step (shoulder) K2 is formed in the X-axis direction. Therefore, W0=W1+W2+W3+2×U+K1+K2 is established.

The supporting part 11 is formed into a square pole having a width (dimension in the X-axis direction), which is one third to equal to a width W0 of the base 9, and a thickness t (dimension in the Z'-axis direction). However, when the base 9 has a somewhat large height D, it is not necessary to form the supporting part 11.

Figure 3:
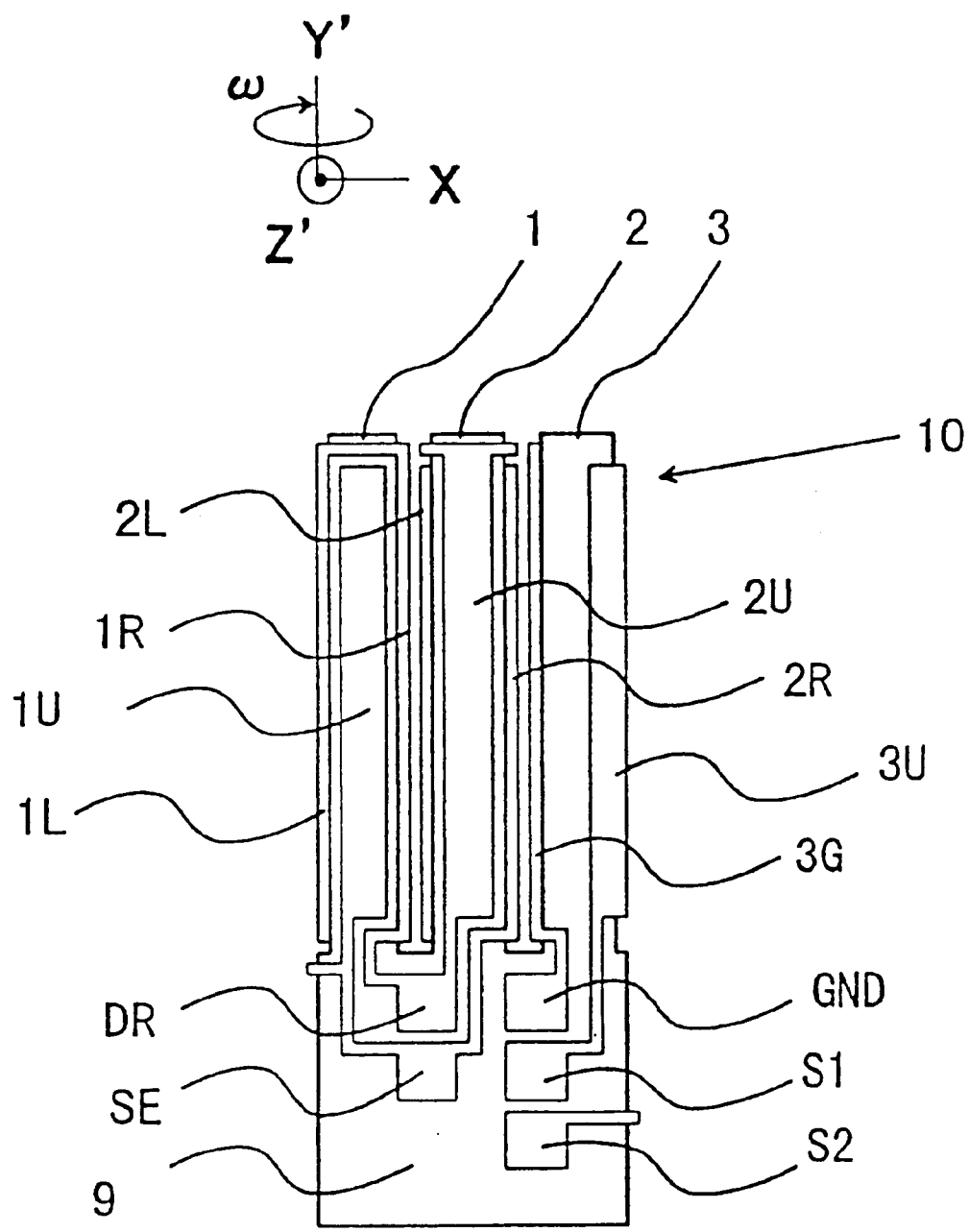
FIG. 3 is an outside view showing the vibration gyro with a three-tine tuning fork taken in a Z'-axis direction according to one aspect of the present invention.
Figure 4:
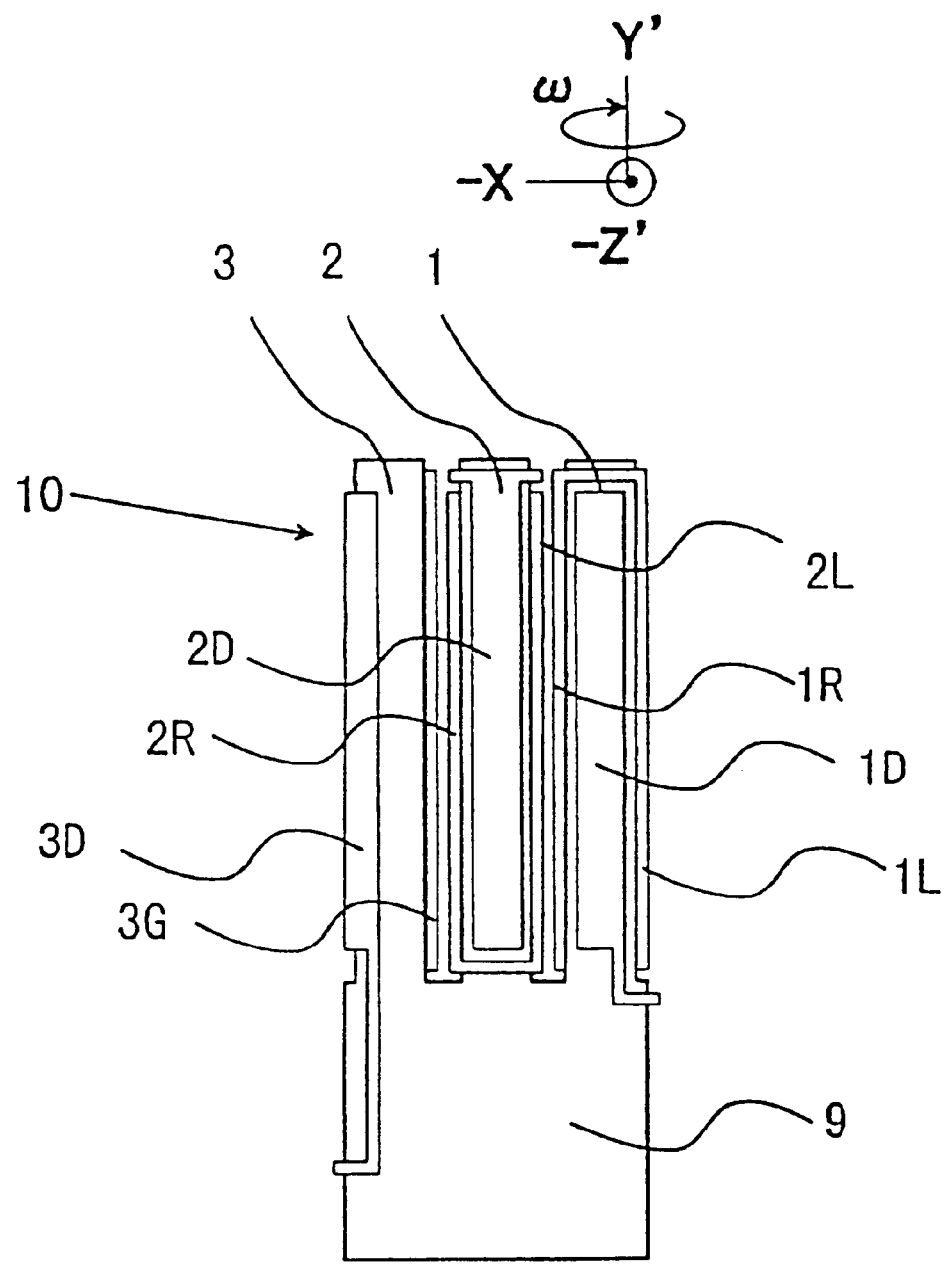
FIG. 4 is an outside view showing the vibration gyro of FIG. 3 taken in the −Z'-axis direction.
Figure 5:
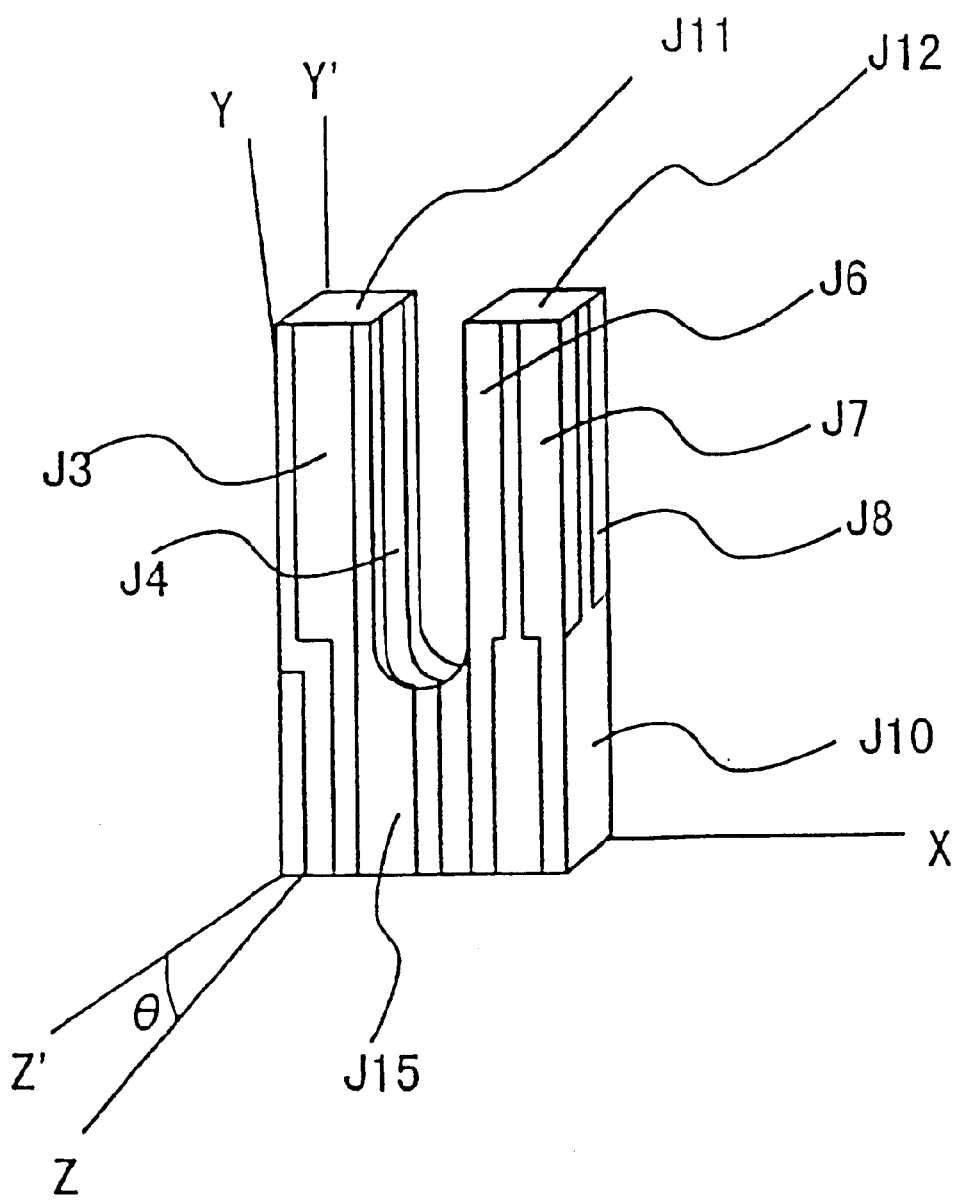
FIG. 5 is a perspective view showing a conventional vibration gyro with a two-tine tuning fork.
Figure 6:
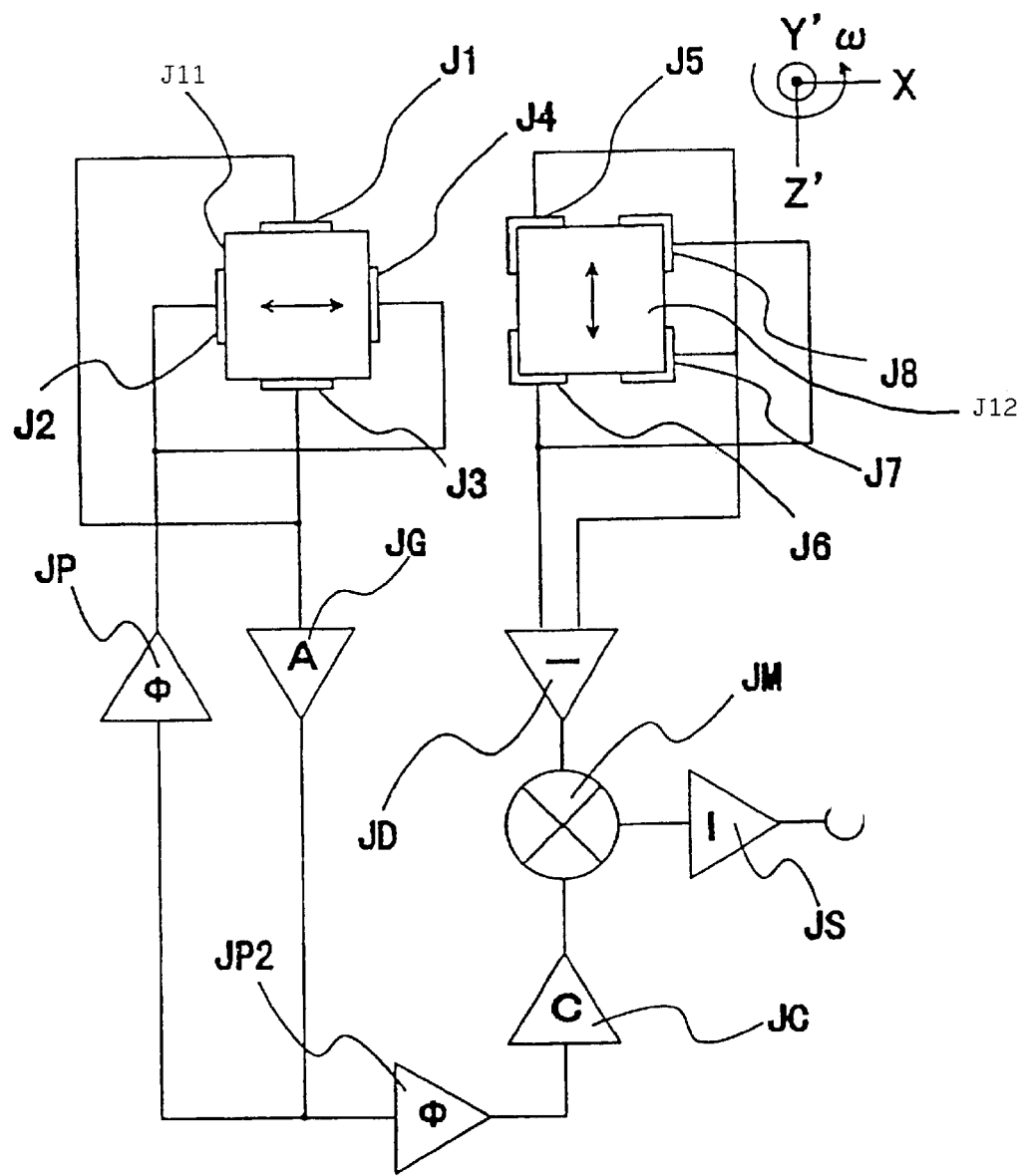
FIG. 6 is a circuit diagram showing electrodes deposited onto a vibrator constituting the vibration gyro of FIG. 5 and the wiring of the electrodes.

FIGS. 3 and 4 show a state in which electrodes composed of metallized films are formed on the sides of the tines 1 to 3 of the three-tine tuning fork of FIG. 1. Here, the supporting part 11 not relating to the explanation of the electrodes is omitted from illustration. FIG. 3 shows the three-tine tuning fork taken in the Z'-axis direction. FIG. 4 shows the three-tine tuning fork taken in the −Z'-axis direction.

The electrodes are formed by preparing a mask with a shape formed by etching in advance, and then performing vacuum deposition with the mask adhered closely to the side where the electrodes of the tines 1 to 3 are formed. The electrodes on the left and right sides of the tines 1 to 3 can be formed by rotating the depositing direction.

Figure 2:
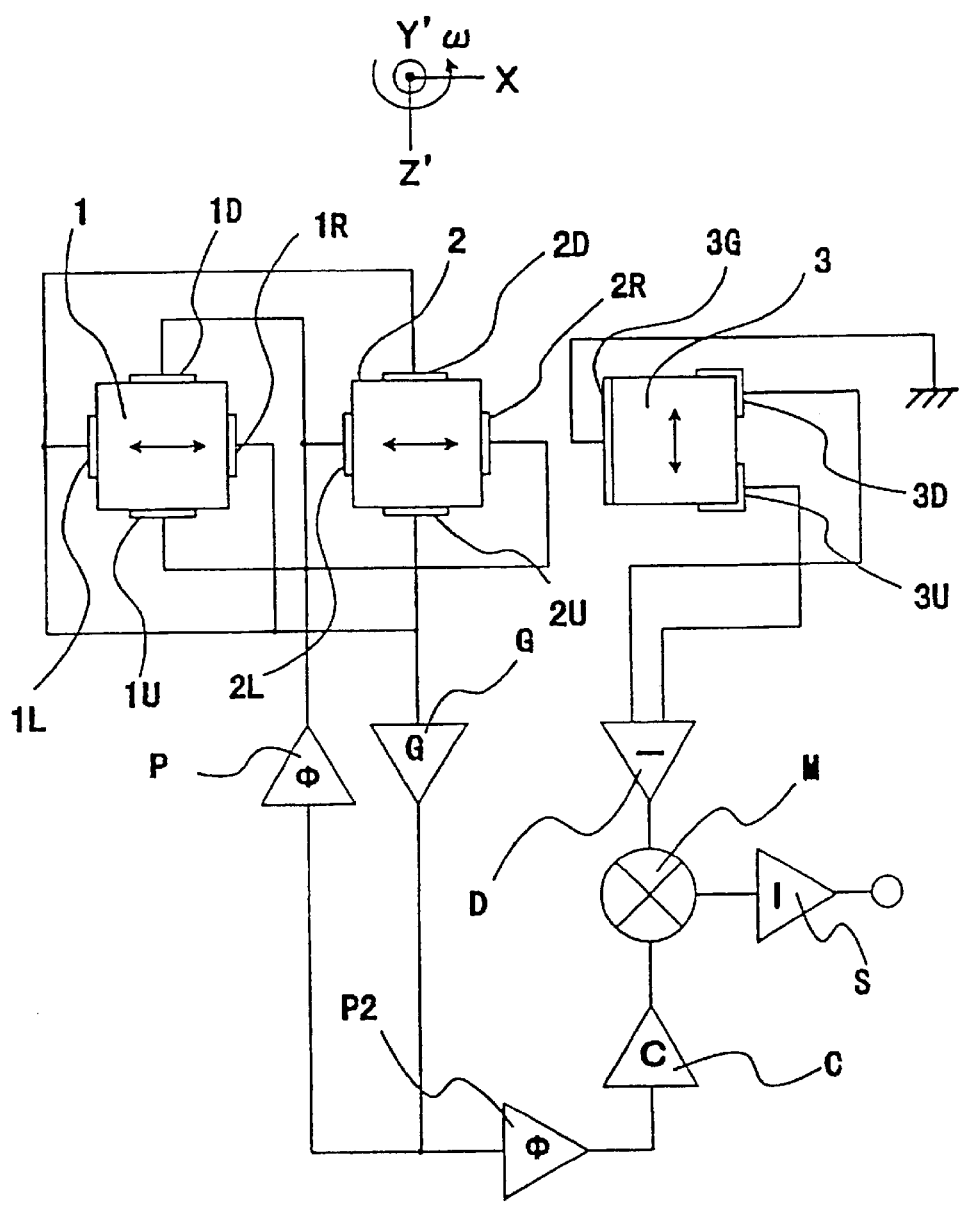
FIG. 2 is a circuit diagram showing electrodes deposited onto the vibrator of FIG. 1 and a wiring of the electrodes.

As shown in FIGS. 3, 4, and a block diagram of FIG. 2, an electrode 1U is deposited on the front of the tine 1, an electrode 1D is deposited on the back of the tine 1, an electrode 1L is deposited on the left side of the tine 1, and an electrode 1R is deposited on the right side of the tine 1. An electrode 2U is deposited on the front of the tine 2, an electrode 2D is deposited on the back of the tine 2, the electrode 2L is deposited on the left side of the tine 2, and an electrode 2R is deposited on the right side of the tine 2. Further, an electrode 3U is deposited so as to cover from the front to the right side of the tine 3, an electrode 3D is deposited so as to cover from the back to the right side of the tine 3, and an electrode 3G is deposited on the left side of the tine 3.

These electrodes are all formed into rectangles. Moreover, terminals DR, SE, S1, S2 and GND for making connection to a circuit and lead wires for connecting the terminals and the electrodes of the individual tines are deposited on a surface of the base 9.

As shown in FIG. 2, a driving circuit is constituted of a self-excited oscillating circuit which restores a signal from the detecting electrodes 1L, 1R, 2U, and 2D to the electrodes 1U, 1D, 2L, and 2R via the amplifier G and the phase-shift circuit P. Meanwhile, as shown in FIG. 2, a detecting circuit is constituted of a differential buffer D for detecting a signal from the detecting electrodes 3U and 3D, a phase-shift circuit P2 for changing the phase of the output of the amplifier G, a comparator C for binarizing a signal of a phase detecting circuit, a multiplying circuit M for multiplying the output of the differential buffer D by the output of the phase-shift circuit P2, and an integrating circuit S for integrating the output of the multiplying circuit M for generating direct currents. When the detecting circuit is constituted of a circuit with three power source systems, the electrode 3G which is not directly connected to a driving detecting circuit is connected to the ground.

The following will discuss a method of electrically driving the three-tine tuning fork 10 and finding an angular velocity ω from voltage output, which is the rotating result of the three-tine tuning fork 10.

In the vibration gyro, it is ideal that only a self-contained vibration mode is used in the vibrator, and a node of vibration in the vibration mode is supported so as to obtain a stable vibration gyro which does not depend upon external environment. However, it is quite rare to find a vibrator in which both of two intersecting vibrating directions satisfy such conditions.

Incidentally, two-tine tuning fork provides a vibration (in-plane vibration) in which the two tines practice primary bending while balancing in opposite directions within a plane determined by the two tines. Such tuning fork is used as the most excellent vibrator for an oscillator and so on. Further, three-tine tuning fork provides a vibration (out-of-plane vibration) in which the central tine and two tines on both sides practice primary bending in opposite directions perpendicular to the plane determined by the three tines. Such a tuning-fork has also been used as an excellent vibrator which can provide vibration as good as in-plane vibration of a two-tine tuning fork.

In the present invention, excellent vibration matching in-plane vibration of a two-tine tuning fork and excellent vibration matching out-of-plane vibration of a three-tine tuning fork are used for driving and detection of a vibration gyro.

Moreover, in the vibration gyro, it is desirable that a detecting part do not produce output irrelevant to Coriolis force while driving vibration occurs, in view of a high S/N ratio and suppression of troublesome drift of output during a non-rotation period. This is because when output is not produced during the non-rotation period, drift does not exist.

When the orthogonality of driving vibration and detecting vibration is imperfect, driving vibration (irrelevant to Coriolis force) mechanically generates detecting vibration. Moreover, when the symmetry of the electrodes is imperfect, driving output (irrelevant to Coriolis force) electrically generates detecting output. Thus, for a vibrator manufactured with limited working accuracy, it is desirable for the detecting part of the vibrator to stand still, when no rotation is made, regardless of driving vibration during the occurrence of driving vibration, on the other hand, to vibrate largely (as a part of the vibrator of detecting vibration) when detecting vibration occurs as a result of the rotation of vibrator at an angular velocity ω.

Incidentally, the three-tine tuning fork vibrator constituting the vibration gyro of the present invention has a plurality of natural vibration modes. Of the vibration modes, primary bending vibration of the three tines 1 to 3 in the X-axis direction, which completes within a plane (X-Y' plane) perpendicular to the thickness direction of the three-tine tuning fork 10, is referred to as "in-plane vibration" of the three-tine tuning fork 10. Further, primary bending vibration of the three tines 1 to 3 in the thickness direction (Z'-axis direction) of the three-tine tuning fork 10 is referred to as "out-of-plane vibration" of the three-tine tuning fork 10.

Figure 8:
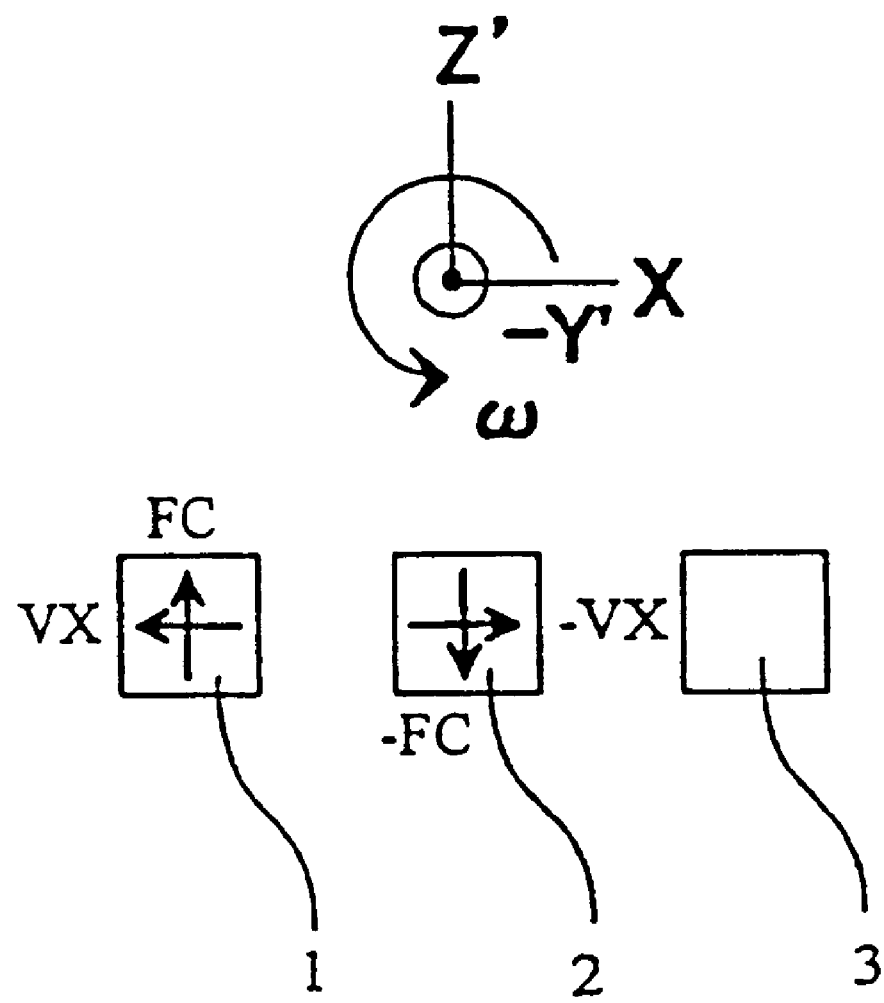
FIG. 8 is an explanatory drawing showing driving vibration of the vibrator shown in FIG. 1.

Next, referring to FIG. 8, the driving vibration of the three-tine tuning fork 10 will be discussed. In the in-plane vibration of the three-tine tuning fork 10, the following vibration mode is provided: in-plane vibration is made such that the tines 1 and 2 are bending in opposite directions, while the tine 3 stands still during the vibration. FIG. 8 shows the displacement directions of the tines at a moment by arrows. The vibration mode will be referred to as driving vibration.

Figure 7:
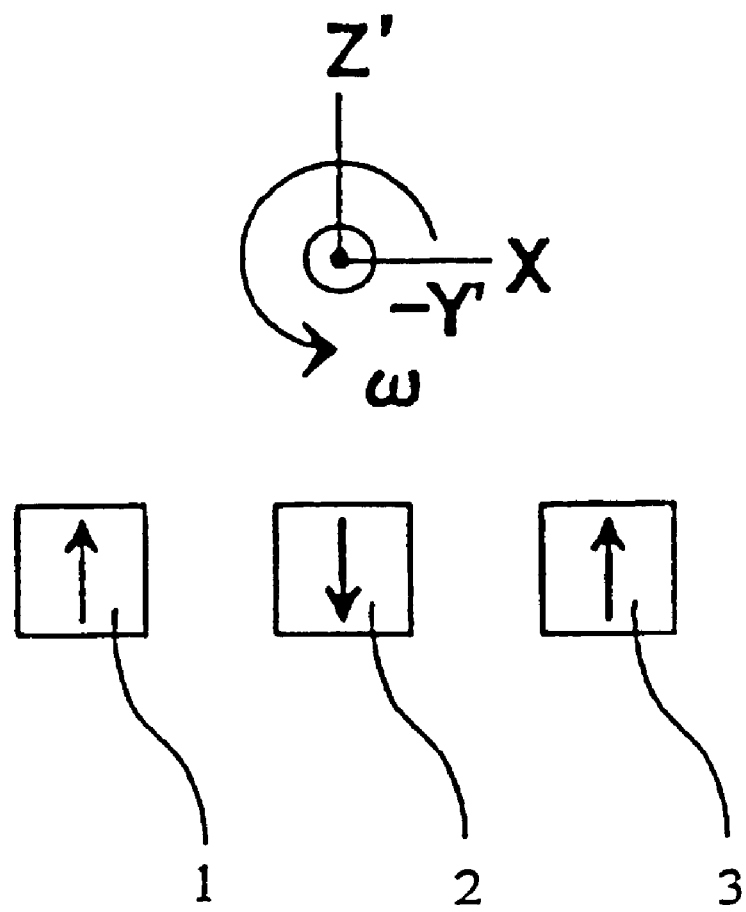
FIG. 7 is an explanatory drawing showing detecting vibration of the vibrator shown in FIG. 1.

Referring to FIG. 7, the detecting vibration of the three-tine tuning fork 10 will be discussed. FIG. 7 is a sectional view showing the tines 1 to 3 taken in the −Y'-axis direction, and FIG. 7 shows the displacement directions of the tines 1 to 3 at a moment by arrows. FIG. 7 shows a vibration mode in which a set of tine 1 and the tine 3 is bending in an opposite direction from the tine 2, in the out-of-plane vibration of the three-tine tuning fork 10. The out-of-plane vibration of the vibration mode is referred to as "detecting vibration."

When the three-tine tuning fork 10 is rotated around the Y'-axis at an angular velocity ω, as shown in FIG. 8, Coriolis force Fc is applied to the left tine 1, which moves with a velocity VX, in a direction orthogonal to driving vibration. Moreover, Coriolis force −Fc is applied to the central tine 2, which moves with a velocity −VX, in a direction orthogonal to driving vibration. Namely, the Coriolis forces Fc and −Fc are applied to the left tine 1 and the central tine 2 in the direction of out-of-plane vibration at a frequency of driving vibration.

Therefore, when the three-tine tuning fork 10 undergoing driving vibration is rotated around the Y'-axis with an angular velocity ω, detecting vibration is excited by Coriolis force via the movements of the left tine 1 and the central tine 2. However, as Coriolis force is in proportion to the speed, it should be noted that detecting vibration resulting from driving vibration is delayed in displacement phase from driving vibration by 90 degrees.

Referring to FIG. 2, the following will discuss a method for electrically detecting driving by using a driving detecting circuit.

First, the following will discuss the case where the tine 2 generates in-plane vibration. When the tine 2 is bent in the X-axis direction, a part around the electrode 2L extends in the Y'-axis direction and a part around the electrode 2R shrinks in the Y'-axis direction. At this moment, an electric field appears in the −X-axis direction around the electrode 2L in crystal due to the piezoelectric effect, and an electric field appears around the electrode 2R in the X-axis direction due to the piezoelectric effect. These electric fields cause the electrodes 2U and 2D to be higher in potential than the electrodes 2L and 2R.

On the contrary, when voltage is applied to the electrodes 2L and the electrode 2U or 2D from the outside and inverse voltage is applied between the electrode 2U or 2D and the electrode 2R from the outside, since the piezoelectric effect is reversible, an electric field appears around the electrode 2L in the −X-axis direction in quartz, and an electric field appears around the electrode 2R in the X-axis direction. These electric fields cause the part around the electrode 2L of the tine 2 to expand and the part around the electrode 2R to shrink. Consequently, the tine 2 is bent in the X-axis direction.

Therefore, voltage generated on the electrode 2U or 2D is amplified by performing bending in the X-axis direction, a phase is adjusted, and the voltage is applied to the electrodes 2L and 2R, so that in-plane vibration can be excited using the tine 2.

In the present invention, both the tines 1 and 2 operated by driving vibration are driven. Namely, in consideration of the operating directions of the tines of driving vibration shown in FIG. 8, as to the tine 1, voltage is applied to the electrodes 1U and 1D on the front and the back with the voltages of the left and right electrodes 1L and 1R used as reference voltages. As to the tine 2, voltage is applied to the left and right electrodes 2L and 2R on the front and the back with the voltages of the electrodes 2U and 2D used as reference voltages.

In the present invention, voltages from the electrodes 1L, 1R, 2U, and 2D are inputted to the amplifier G, the output of the amplifier G is phase-shifted by the phase-shift circuit P, and the output is applied to the electrodes 1U, 1D, 2L, and 2R, so that driving vibration is self-excited.

In this state, when the three-tine tuning fork 10 is entirely rotated around the Z'-axis with an angular velocity ω, as described above, detecting vibration is generated on the three-tine tuning fork 10 via the movements of the tines 1 and 2 of the three-tine tuning fork 10, and out-of-plane vibration is generated on the tine 3 which stood still when no rotation was made. The following will discuss the case where the tine 3 has out-of-plane vibration.

When the tine 3 is bent in the Z'-axis direction, a part around the electrode 3D shrinks in the Y'-axis direction. At this moment, due to the piezoelectric effect, an electric field appears in the X-axis direction on a region where the electrode 3D of the tine 3 exists, taken in the Z'-axis direction. Therefore, the electrode 3D is lower in potential than the reference electrode 3G. At this moment, a part around the electrode 3U extends in the Y'-axis direction. Due to the piezoelectric effect, taken in the Z'-axis direction, an electric field appears in the −X-axis direction on a region where the electrode 3U of the tine 3 exists. Therefore, the electrode 3U is higher in potential than the reference electrode 3G.

On the contrary, when the tine 3 is bent in the −Z'-axis direction, the region where the electrode 3D exists extends in the Y'-axis direction. At this moment, due to the piezoelectric effect, an electric field appears in the −X-axis direction on the region where the electrode exists. Therefore, the electrode 3D is higher in potential than the reference electrode 3G. At this moment, a part around the electrode 3U shrinks in the Y'-axis direction. Due to the piezoelectric effect, taken in the Z'-axis direction, an electric field appears in the X-axis direction on the region where the electrode 3U of the tine 3 exists. Thus, the electrode 3U is lower in potential than the reference electrode 3G.

That is, detecting vibration can be detected as voltages generated at the electrodes 3U and 3D in opposite directions with reference to the potential of the reference electrode 3G of the tine 3. Of course, it is also preferable to directly measure a voltage between the electrodes 3U and 3D without using the electrode 3G.

The electrode 3G is connected to the ground to produce a reference voltage, and voltages of the electrodes 3U and 3D are inputted to one of the input terminals of the multiplying circuit M via the differential buffer D. Meanwhile, the output of the oscillating system for driving vibration is inputted to the other input terminal of the multiplying circuit M via the amplifier G, the phase-shift circuit P2, and the comparator C. The phase-shift circuit P2 phase-shifts the output of the amplifier G by 90 degrees in order to correct generation of Coriolis force with 90-degree delay. The comparator C binarizes an input signal to produce a reference signal. And then, the result of multiplication and detection in the multiplying circuit M is further smoothed in the integrating circuit S, and is detected as direct-current output. The direct-current output is in proportion to Coriolis force, and Coriolis force is in proportion to an angular velocity ω, so that the angular velocity ω can be found based on the direct-current output. In this case, differential detection is used for detection to improve the symmetry of the circuit and to reduce drift of the circuit system.

Although the three-tine tuning fork constituting the vibration gyro 10 can be manufactured by etching or a wire saw and so on, for accurate manufacturing, Q values of the driving vibration and detecting vibration can reach 100,000 or more. In case where a resonance frequency is designed 10 kHz, Q value is sufficiently high on the detecting side, so that if a resonance-type design in which the resonance frequencies of driving vibration and detecting vibration conform to each other is adopted, attenuation of detecting vibration generated by Coriolis force with respect to time becomes gentle, thereby seriously deteriorating time response with respect to change in angular velocity ω and making such design impractical. In contrast, as to a design in which driving vibration and detecting vibration are different in resonance frequency, time response is improved exponentially dependent on a difference between the resonance frequency of the driving vibration and that of detecting vibration. In the present invention, a difference in resonance frequency between driving vibration and detecting vibration is set at 20,000 PPM or more so as to achieve response of 100 Hz or more.

[Embodiment 1]

First, Embodiment 1 of a vibration gyro according to the present invention will be discussed below.

The object of the vibration gyro is to reduce leakage of vibration to a supporting part. Leakage of vibration can be represented using as an index a change in natural frequency of out-of-plane vibration resulting from difference of supporting modes.

Here, a width W3 of a right tine 3 was made smaller than a width W1 of a left tine 1, and the relationship between (W1−W3)/W1 and a difference Δf in natural frequency of out-of-plane vibration resulting from the differences of supporting modes (difference of perfect fixation of the supporting part and perfect release of the supporting part). The experimental results were obtained as follows.

| (W1−W3)/W1 | Δf |
|---|---|
| 100,000 PPM | 0 PPM |
| 150,000 PPM | 50 PPM |
| 200,000 PPM | 100 PPM |

It has been found that when a frequency difference Δf is 100 PPM or less, the vibration gyro is satisfactory. Thus, from the experimental results, it is understood that out-of-plane vibration of a three-tine tuning fork 10 preferably has (W1−W3)/W1 of 200,000 PPM or less, that is, 20% or less, in view of reduction of leakage of vibration to the supporting part.

In consideration of the above results, in the present embodiment, the width W3 of the right tine 3 is reduced from the widths W1 and W2 of the other tines 1 and 2 by one tenth or more. Namely, (W1−W3)/W1 is set at 100,000 PPM or more.

Next, referring to FIG. 8, the driving vibration of the three-tine tuning fork 10 will be described. FIG. 8 is a sectional view showing tines 1 to 3 taken in the −Y'-axis direction, and shows the displacement directions of the tines 1 to 3 at a moment by arrows. The tine 1 and the tine 2 of the three-tine tuning fork 10 practice in-plane vibration which bends in opposite directions each other. The tine 3 stands still during the vibration. The in-plane vibration generated on the tine 1 and the tine 2 will be referred to as "driving vibration."

The left tine 1 and the central tine 2 of the three-tine tuning fork are arranged in a manner similar to the left and right tines of a two-tine tuning fork. Therefore, it can be said that driving vibration on the tine 1 and the tine 2 of the three-tine tuning fork 10 is similar to in-plane vibration of the two-tine tuning fork. Incidentally, it was confirmed that as in-plane vibration of the two-tine tuning fork is made by a self-contained vibrator in which the lower part of the base is used as a supporting part, driving vibration on the left tine 1 and the central tine 2 of the three-tine tuning fork 10 has less leakage of vibration to the supporting part.

The right tine 3 stands still during driving vibration on the left tine 1 and the central tine 2. This is because a pair of the left tine 1 and the central tine 2 can realize self-contained vibration. Further, a width W3 of the right tine 3 is smaller than widths W1 and W2 of the other tines 1 and 2 by one tenth or more, and the resonance frequency of the right tine 3 in the X-axis direction is alien from the resonance frequency of in-plane vibration of the tine 1 and the tine 2. Consequently, the tine 3 is not affected by the vibration of the tine 1 and the tine 2, so that the right tine 3 stands still.

In out-of-plane vibration, the resonance frequencies specific to the tines 1 to 3 are not affected by the widths W1 to W3 of the tines 1 to 3 but are determined by a thickness t, so that a detecting vibration where all the three tines 1 to 3 vibrate is realized even when the width of the tine 3 is largely changed. Meanwhile, in in-plane vibration, a driving vibration where only the tine 3 stands still is realized, as described above. This is a major characteristic of the three-tine tuning fork according to the present embodiment.

In general, when the widths W1 to W3 of the three tines 1 to 3 are equal on the three-tine tuning fork, it is not possible to avoid leakage of vibration to the supporting part 11 in in-plane vibration of the three-tine tuning fork. This is because, for the three tines 1 to 3 arranged in parallel, the central tine 2 and the tines 1 and 3 on the right and left are different in natural frequency. While both sides of the central tine 2 are connected to a base 9, only the right side of the left tine 1 is connected to the base 9 and the base 9 does not exist on the left side of the tine 1, and the only the left side of the right tine 3 is connected to the base 9 and the base 9 does not exist on the right side of the tine 3. As a result, the expansion and shrinkage of the left and right tines 1 and 3 (a change in length in the Y'-axis direction) caused when these tines 1 and 3 are bent is larger than the expansion and shrinkage of the central tine 2 caused when the central tine 2 is bent. Hence, the left and right tines 1 and 3 are lower in natural frequency than the central tine 2.

In in-plane vibration where the central tine 2 and the left and right two tines 1 and 3 having different natural frequencies are vibrated in opposite directions, momentums cannot be balanced only with the tines 1 to 3, resulting in vibration on the supporting part 11.

The above phenomenon can be eliminated by forming shoulders of widths K1 and K2 on the left and right sides of the base 9, respectively, as shown in FIG. 1, so that deformation of the base 9 is suppressed and the resonance frequency of the central tine 2 is caused to coincide with resonance frequencies of the left and right tines 1 and 3.

Moreover, when the width W1 of the left tine is made equal to the width W2 of the central tine of the three-tine tuning fork 10, the width W3 of the right tine 3 is made smaller than the width W2 of the central tine 2 by one tenth or more, and in-plane vibration is applied only to the tines 1 and 2, the left tine 1 is slightly lower in natural frequency than the central tine 2, resulting in leakage of vibration to the supporting part.

In consideration of the above phenomenon, in the present embodiment, in addition to reducing the width W3 of the right tine 3 by one tenth or more as compared with the width W2 of the central tine 2, the width WI of the left tine 1 is made larger than the width W2 of the central tine by about one twelfth. Furthermore, the left side of the base 9 of the three-tine tuning fork 10 is protruded from the left side of the left tine 1 by about K1=W2/15 so as to form a left shoulder, and the right side of the base 9 is protruded from the right side of the right tine 3 by about K2=W2/15 so as to form a right shoulder. Hence, in-plane vibration, it is possible to eliminate leakage of vibration to the supporting part 11.

| | |
|---|---|
| Width W1 of the left tine 1: | 1.04 to 1.06 |
| Width W2 of the central tine 1: | 1 |
| Width W3 of the right tine 3: | 0.8 to 0.9 |
| Shoulder width K1 and K2: | 0.00 to 0.075 |
| Groove width U: | 0.05 to 1.0 |
| Thickness t: | 0.95 to 0.98 |

As described above, the vibration gyro of the present embodiment uses the three-tine tuning fork vibrator in which leakage of vibration from the supporting part to the outside, which deteriorates Q value, is little. In consequence, it is possible to make the most of the property of a piezoelectric single crystal to obtain high Q value for both driving vibration and detecting vibration. Further, as the detecting part which is not vibrated by driving vibration is used, low noise N is achieved, with the result that a high S/N ratio and low drift are obtained in the present embodiment.

[Embodiment 2]

Next, Embodiment 2 of a vibration gyro according to the present invention will be discussed below.

The above-described Embodiment 1 provides a model in which, in in-plane vibration for driving, in particular, emphasis is placed on connection of vibrations of the individual tines of the three-tine tuning fork 10 to obtain high Q value, and groove widths between the tines and shoulder widths are made small as far as possible in consideration of machining with a wire saw.

The object of the present embodiment is to provide a three-tine tuning fork 10 which has a feature other than attainment of high Q value for improvement of an S/N ratio and reduction of drift of the vibration gyro In a method of manufacturing the vibration gyro of the present embodiment, etching is mainly used. In the case of etching on quartz, it should be noted that the parts cannot be simply formed into rectangular solids on the ground that machining tends to progress comparatively fast in the Z'-axis direction.

The structure of the present embodiment is substantially identical to that of Embodiment 1, but the dimensions of parts are different from those of Embodiment 1. Thus, the present embodiment not only has functions common to those of Embodiment 1 but also has other functions. Hereinafter, the structure and function shared by Embodiment 1 will be omitted and only the structure and function specific to the present embodiment will be described.

First, in the present embodiment, a groove width U and shoulder widths K1 and K2 are substantially equal to or larger than a width W1 of the left tine 1 and a width W2 of the central tine 2.

With the above dimensions, in in-plane vibration, the connection of vibration on the left tine 1 and the tine 2 is reduced, and Q value is reduced to a half or less. However, at this moment, the base around the tine 1 and the central tine 2 has the same conditions on the right and left over a wide range. Hence, even when the width W1 of the tine 1 and the width W2 of the tine 2 are equal to each other, the in-plane vibration of the three-tine tuning fork 10 does not cause vibration of the base 9. Further, reduced connection of vibrations of the tines causes further increase of standstill of the right tine 3 for detection at the time of driving. Besides, as a distance between the tine 2 and the tine 3 is increased, electrical leakage output resulting from electrostatic capacity coupling between electrodes is also reduced.

Further, in the present embodiment, the width W3 of the tine 3 for detection is about half of the width W1 of the tine 1 and the width W2 of the tine 2.

With these dimensions, the connection of the tine 3 with respect to the tines 1 and 2 reduces surely, with the result that the tine 3 for detection at the time of driving can stand still satisfactorily. However, with this configuration, unlike in-plane vibration for driving, the three tines cannot be balanced at all in out-of-plane vibration for detection, with the result that the supporting part of the three-tine tuning fork 10 may vibrate rotationally around Y'-axis during detecting vibration.

The vibration gyro configured in the way described above is subjected to reduction of Q value and a shake of the base due to detecting vibration, as compared with Embodiment 1, but enjoys an improvement of standstill of the detecting part during driving so that detecting accuracy of the vibration gyro can be improved, instead. Here, this effect of the present embodiment will be discussed below referring to FIG. 9.

Figure 9:
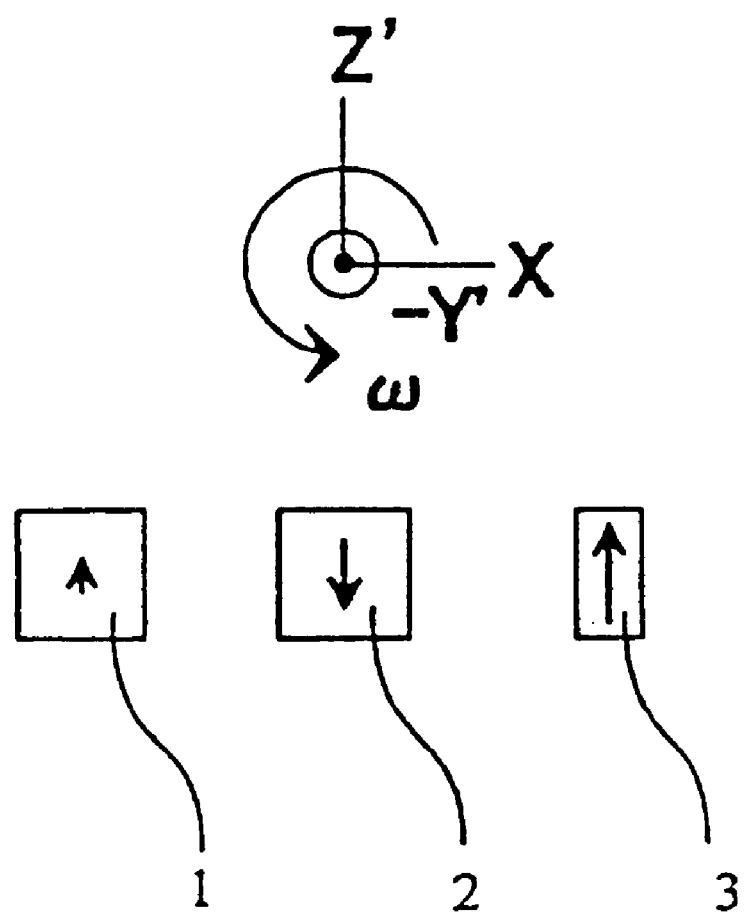
FIG. 9 is a diagram showing the magnitude of the detecting vibration using the length of arrows in case where the tines of the vibrator with three-tine tuning fork are changed in width.

FIG. 9 is a sectional view showing the tines of the three-tine tuning fork 10 taken from the −Y'-axis direction, and in FIG. 9, arrows indicate the displacement directions of the tines at a moment in a vibration mode for creating out-of-plane vibration, in which a set of the left tine 1 and the right tine 3 and the central tine 2 are bent in opposite directions. In the present embodiment, the vibration mode is used as detecting vibration.

It should be noted that in the present embodiment of FIG. 9, the left tine 1 is extremely small in amplitude in the Z'-axis direction and the right tine 3 is extremely large in amplitude, unlike Embodiment 1 of FIG. 7. In FIG. 9, the length of the arrow indicates the amplitude. The smaller the width W3 of the tine 3 is than the width W1 of the tine 1 and the width W2 of the tine 2, the larger the effect is, and the effect is further improved by shortening the length of the tine 3 relative to the lengths of the tine 1 and the tine 2.

The detecting vibration of the three-tine tuning fork 10 of FIG. 9 is excited by the driving vibration of FIG. 8, in which only the left tine 1 and the central tine 2 are used, via Coriolis force. Therefore, the Coriolis force drives only the tine 1 and the tine 2 in the Z'-axis direction. At this moment, when the movement of the tine 1 is observed, as the left tine 1 cannot be largely bent and only small deformation can be made thereon, Coriolis force applied to the tine 1 largely deforms the base. This means that the Coriolis force applied to the tine 1 is propagated to a part which is likely to deform in the three-tine tuning fork 10, without being expended by deformation on the tine 1. As a result, the Coriolis force resulting from the driving vibration of the tine 1 in the X-axis direction excites the right tine 3 with large amplitude in the Z'-axis direction. Namely, most energy of the driving vibration of the left tine 1 is transferred to the right tine 3. This effect will be referred to as "inverse lever effect."

The "inverse lever effect" is in proportion to the magnification of amplitude in detecting vibration of the tines 1 to 3. In the three-tine tuning fork 10, the tine 3 for detection has amplitude about ten times that in detecting vibration of the driven tine 1. It has been confirmed that the combining effect of "inverse lever effect" of ten times and "standstill of the detecting tine" improves an S/N ratio of the three-tine tuning fork 10 about ten times and reduces drift about one tenth. In the three-tine tuning fork 10 of the present embodiment, the above advantage effect can make up for low Q value and much leakage of vibration to the base 9 in contrast to the tuning-fork discussed in Embodiment 1.

The following shows an example of the dimensions of individual parts of the three-tine tuning fork 10 used in the present embodiment when it is supposed that the width W2 of the central tine is 1.

| | |
|---|---|
| Width W1 of the left tine 1: | about 1.0 |
| Width W2 of the central tine 2: | 1 |
| Width W3 of the right tine 3: | about 0.5 |
| Shoulder width K1 and K2: | about 1.0 to 2.0 |
| Groove width U: | about 1.0 to 2.0 |
| Thickness t: | about 1.0 |

As described above, the vibration gyro of the present embodiment uses a three-tine tuning fork vibrator in which leakage of vibration from the supporting part to the outside, causing deterioration of Q value, is small, so that it is possible to make the most of the property of a piezoelectric single crystal, high Q value is obtained for driving vibration, and the detecting part which cannot be vibrated by driving vibration is used, thereby achieving low noise N. Further, as the amplitude of the detecting tine is large as compared with the amplitude of the tine excited by Coriolis force in the vibration gyro of the present embodiment, high output S is realized by the "inverse lever effect" in detecting vibration. Consequently, a high S/N ratio and low drift are obtained.

[Embodiment 3]

Next, Embodiment 3 of a vibration gyro according to the present invention will be discussed.

A vibration gyro 10 is identical in fundamental structure to the vibration gyro of FIG. 1, but the dimensions of parts are different from those of the vibration gyro shown in FIG. 1.

Figure 10:
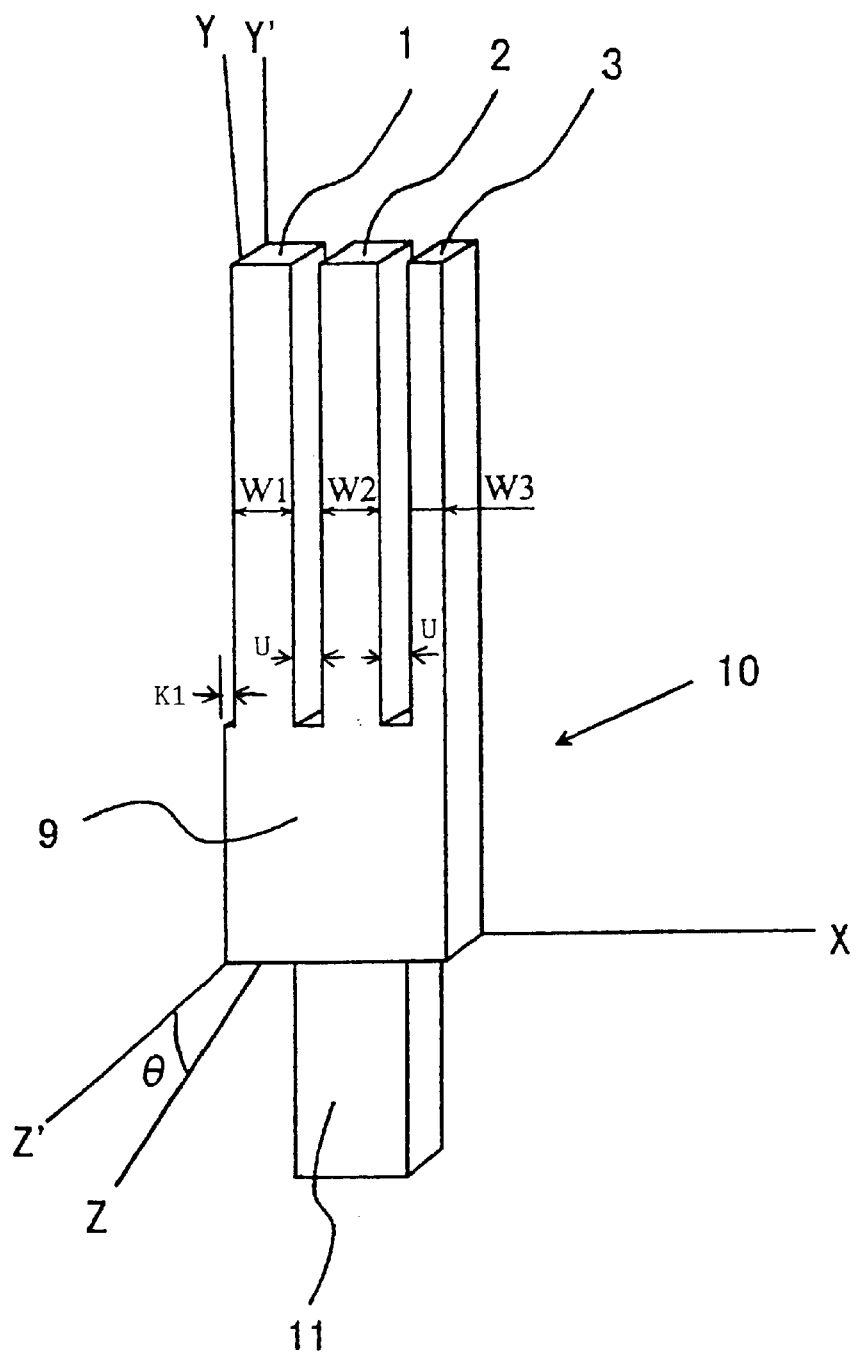
FIG. 10 is a perspective view showing a vibrator constituting a vibration gyro with a three-tine tuning fork according to another aspect of the present invention.

As shown in FIG. 10, in the vibration gyro 10 of the present embodiment, a ratio of width W1 of a left tine 1, width W2 of a central tine 2, and width W3 of a right tine 3 (W1: W2: W3) is substantially 5:5:3. A step (shoulder) of width K1 is formed between the left side of the left tine 1 and the left side of a base 9 and no step is formed between the right side of the right tine 3 and the right side of the base 9. That is, as compared with the vibration gyro 10 shown in FIG. 1, the vibration gyro 10 of the present embodiment shown in FIG. 10 is characterized in that the width W 3 of the right tine 3 is smaller than the widths W1 and W2 of the left tine 1 and the central tine 2 and no shoulder is formed on the right side (K2=0).

As described above, the object of the vibration gyro is to reduce leakage of vibration to a supporting part. In the vibration gyro 10, leakage of vibration can be represented using as an index a change in natural frequency of out-of-plane vibration resulting from difference of supporting modes. When the difference $\Delta f$ between the natural frequency obtained when the supporting part is completely fixed and the natural frequency obtained when the supporting part is completely released is 100 PPM or less, the vibration gyro is satisfactory.

As a result of an experiment, the relationship between a ratio of the width W1 of the left tine 1 to the width W3 of the right tine 3 (W3/W1) and a frequency difference $\Delta f$ is as follows.

| W3/W1 | $\Delta f$ (PPM) |
|---|---|
| 3/5 | 0 |
| 3/5 ± 10% | 100 |

From the above result, it was understood that a vibrator which has a left shoulder of width K1 equal to the groove width U but does not have a right shoulder (k2=0) will be excellent if the ratio of the width W1 of the left tine 1 to the width W3 of the right tine 3 (W3/W1) is set within a range of 3/5±10%.

In the vibration gyro shown in FIG. 10, the three tines 1 to 3 are all rectangular solids, and the widths W1 to W3 are uniform in the longitudinal direction. However, as shown in FIG. 11, if the leading ends of the tines 1 to 3 are increased in width by a prescribed length, it is possible to lower the natural frequency without largely increasing the lengths of the tines 1 to 3.

Figure 11:
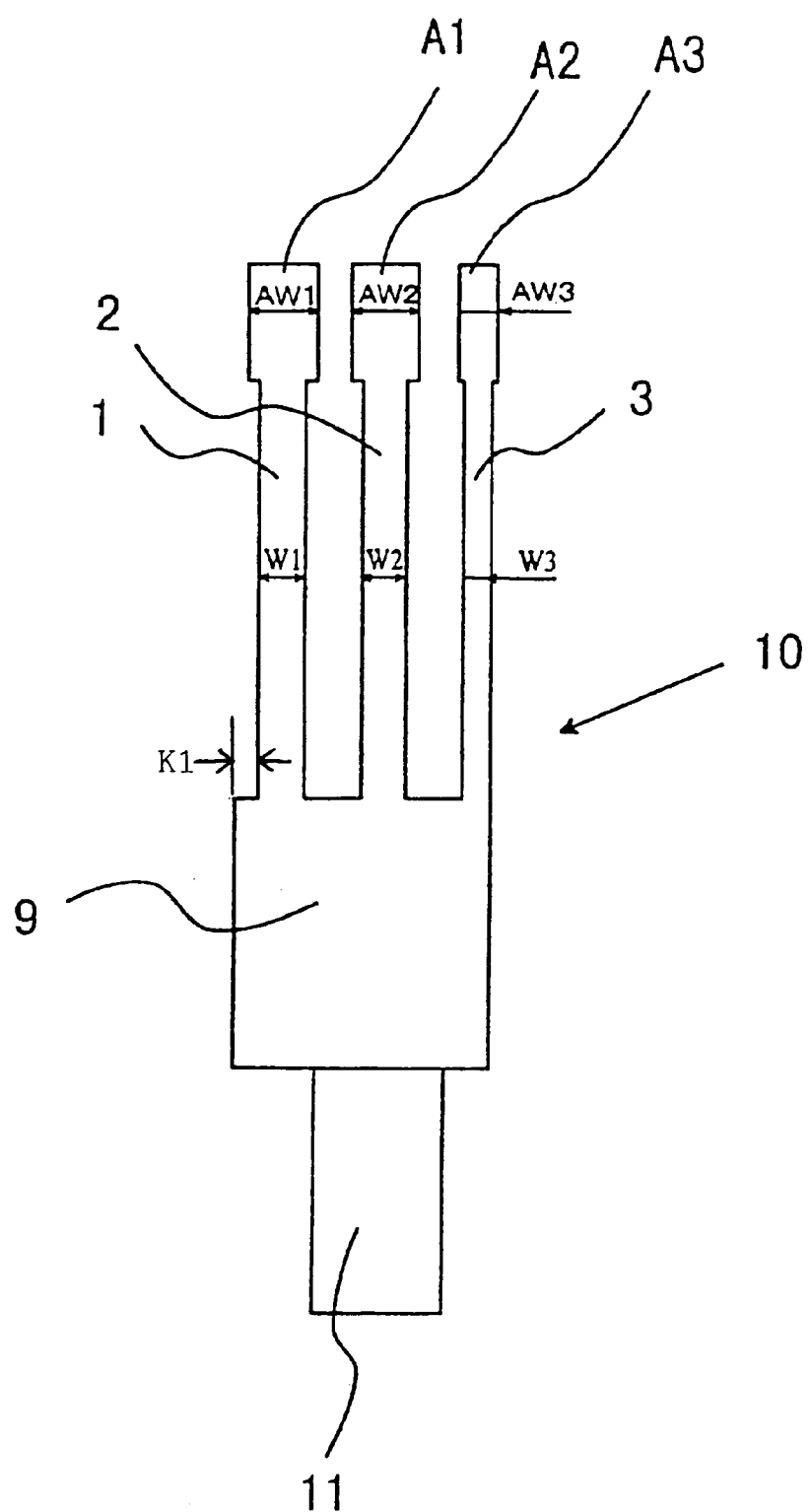
FIG. 11 is a first modification of the vibrator shown in FIG. 10.

In the vibration gyro 10 of FIG. 11, the tines 1 to 3 are equal in length. The widths of the leading ends are represented by AW1 to AW3. From an experimental result, it was found that a frequency difference $\Delta f$ can be minimized when the following conditions are satisfied.

U=K1
W1=W2
AW1=AW2
W3/W1=3/5
AW3/AW1=3/5

Figure 12:
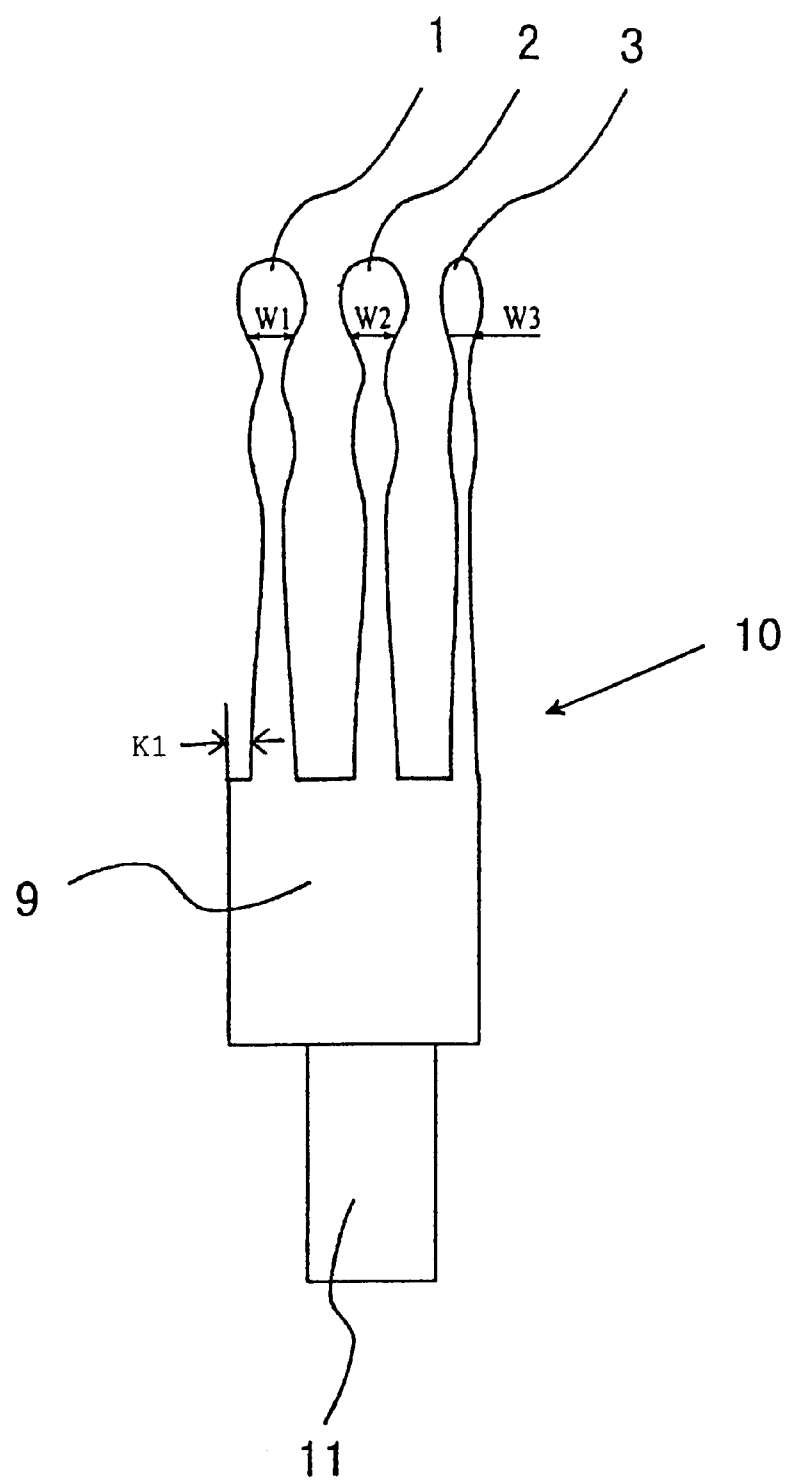
FIG. 12 is a second modification of the vibrator shown in FIG. 10.

This means that as far as the vibration gyro shown in FIG. 12 has a left tine 1, a central tine 2 and a right tine 3 of widths W1, W2 and W3 at a ratio of 5:5:3 at any position in the longitudinal direction (Y'-axis direction), the frequency difference $\Delta f$ can be minimized.

The following shows an example of the dimensions of individual parts of the three-tine tuning fork 10 used in the present embodiment when it is supposed that the width W2 of the central tine is 1.

| | |
|---|---|
| Width W1 of the left tine 1: | 1 |
| Width W3 of the right tine 3: | 0.54 to 0.66 |
| Width K2 of the left shoulder: | 2.0 |
| Width K1 of the right shoulder: | 0 |
| Groove width U: | 2.0 |
| Thickness t: | 0.95 to 0.98 |

In the vibration gyro of the present embodiment, as the mass of the right tine 3 is substantially three fifths (3/5) that of the left tine 1, the quantity of bending of the right tine 3 is larger than that of the left tine 1. This means that the quantity of bending of the tine 1 directly driven by Coriolis force is large than that of the tine 3 for detection. Therefore, an S/N ratio is improved and low drift is realized by improving voltage output which is in proportion to the quantity of bending.

Further, the vibration gyro of the present embodiment uses a three-tine tuning fork vibrator in which leakage of vibration from the supporting part to the outside, causing deterioration of Q value, is small, so that it is possible to make the most of the property of a piezoelectric single crystal, high Q value is obtained for driving vibration, and the detecting part which cannot be vibrated by driving vibration is used, thereby achieving low noise N.

In the case of the above-described vibration gyros 10, it is apparent that when the right tine 3 has the function of the left tine 1 and also the left tine 1 has the function of the right tine 3, completely the same vibration gyro can be obtained. Therefore, in the above description, among the three tines aligned in a single line, one of the two tines adjacent to the central tine on the right and left is simply expressed as the "left tine" and the other tine is simply expressed as the "right tine."

What is claimed is:

1. A vibration gyro, comprising:
   a vibrator composed of a base and three tines which aligned in a single line at prescribed intervals in one direction and extending from the base in a direction perpendicular to the aligning direction,
   an oscillator which drives a second tine positioned at the center and a first tine adjacent to the second tine among said three tines of said vibrator, and
   a detector which detects Coriolis force generated on the third tine;
   wherein when the first tine and the second tine are driven by said oscillator, the third tine is caused to substantially stand still.

2. The vibration gyro according to claim 1, wherein the third tine is caused to substantially stand still by making said third tine smaller in width than the second tine.

3. The vibration gyro according to claim 1, wherein the first tine is substantially equal in width to the second tine.

4. The vibration gyro according to claim 3, wherein said third tine is smaller in width than said second tine by 10% to 20%.

5. The vibration gyro according to claim 1, wherein a shoulder is formed on an end face of said vibrator on the side where said first tine is arranged, at a part shifting from said base to said first tine.

6. The vibration gyro according to claim 5, wherein said first tine and said second tine are substantially equal in width, and said third tine has a width equal to ⅗±10% of width of said second tine.

7. The vibration gyro according to claim 1, wherein said first tine and said second tine are caused to make first bending vibration within a plane perpendicular to a thickness direction of said vibrator by using said oscillator, and second bending vibration perpendicular to said plane, caused by said first bending vibration on said vibrator due to Coriolis force resulting from rotation of said vibrator is detected by said detector by using said third tine.

8. The vibration gyro according to claim 1, wherein when it is supposed that said second tine has a width of 1, said first tine has a width of 1.04 to 1.06 and said third tine has a width of 0.8 to 0.9, and a first shoulder is formed on an end face of said vibrator on the side where said first tine is arranged, at a part shifting from said base to said first tine, and further, a second shoulder is formed on an end face of said vibrator on e side where said third tine is arranged, at a part shifting from said base to said third tine, and the widths of these first and second shoulders are 0.075 or less when it is supposed that said second tine has a width of 1.

9. The vibration gyro according to claim 1, wherein when it is supposed that said second tine has a width of 1, said first tine has a width of 1 and said third tine has a width of about 0.5, and a first shoulder is formed on an end face of said vibrator on the side where said first tine is arranged, at a part shifting from said base to said first tine, and further, a second shoulder is formed on an end face of said vibrator on the side where said third tine is arranged, at a part shifting from said base to said third tine, and the widths of these first and second shoulders are 1 to 2 when it is supposed that said second tine has a width of 1.

* * * * *